US012433297B2

(12) United States Patent
Swayne et al.

(10) Patent No.: US 12,433,297 B2
(45) Date of Patent: Oct. 7, 2025

(54) STEAM COOKING SYSTEM (71) Applicant: Electrolux Home Products, Inc., Charlotte, NC (US)

(72) Inventors: Steven Swayne, Nashville, TN (US); Cathy L. May, Springfield, TN (US); Marco Carnevali, Forli (IT); Massimo Banzato, Forli (IT); Paolo Faraldi, Forli (IT); Brendan McGinnis, Russellville, KY (US); Andrew Worley, Springfield, TN (US)

(73) Assignee: Electrolux Consumer Products, Inc., Charlotte, NC (US)

( * ) Notice: Subject to any disclaimer, the term of this patent is extended or adjusted under 35 U.S.C. 154(b) by 1025 days.

(21) Appl. No.: 17/233,761

(22) Filed: Apr. 19, 2021

(65) Prior Publication Data
US 2022/0330556 A1 Oct. 20, 2022

(51) Int. Cl.
*A21B 3/04* (2006.01)
*A23L 5/10* (2016.01)
(Continued)

(52) U.S. Cl.
CPC ........ *A21B 3/04* (2013.01); *A23L 5/13* (2016.08); *A47J 27/04* (2013.01); *F24C 7/067* (2013.01);
(Continued)

(58) Field of Classification Search
CPC ......... A21B 3/04; A23L 5/13; A23V 2002/00; A47J 27/04; A47J 2027/043;
(Continued)

(56) References Cited

U.S. PATENT DOCUMENTS 4,697,067 A * 9/1987 Rosset ............... F24C 15/00
219/401
4,700,685 A 10/1987 Miller
(Continued)

FOREIGN PATENT DOCUMENTS

EP 0277337 8/1988
EP 1995525 11/2008
(Continued)

OTHER PUBLICATIONS

Convection Steam Oven Shootout—Top 5 Ratings 2016. Blair, John. Mar. 1, 2016. https://appliancebuyersguide.com/top-5-combi-steam-ovens-for-2016-ratings/.
(Continued)

*Primary Examiner* — Helena Kosanovic
*Assistant Examiner* — Thao Uyen Tran-Le
(74) *Attorney, Agent, or Firm* — Chrisman Gallo Tochtrop LLC (57) ABSTRACT Improved steam ovens and methods for operating steam ovens include selectively operating a gas heating element below a water reservoir at the bottom of a cooking cavity with water present therein, a convection heating element in the cooking cavity, and a convection fan adjacent the cooking cavity in order to achieve and maintain a predetermined cooking temperature within the cooking cavity. Alternatively, where there is no heating element below a water reservoir in the cooking cavity, a convection system can be operated in order to direct heated air such that it impinges directly on water in the water reservoir, thereby converting the water to steam 19 Claims, 9 Drawing Sheets (51) Int. Cl.
  *A47J 27/04* (2006.01)
  *F24C 7/06* (2006.01)
  *F24C 15/32* (2006.01)
(52) U.S. Cl.
  CPC ........ *F24C 15/327* (2013.01); *A23V 2002/00* (2013.01); *A47J 2027/043* (2013.01); *A47J 2202/00* (2013.01)
(58) Field of Classification Search
  CPC ..... A47J 2202/00; F24C 7/067; F24C 15/327; F24C 1/04; F24C 3/128; F24C 15/325
  See application file for complete search history.

(56) References Cited

U.S. PATENT DOCUMENTS

| | | | |
|---|---|---|---|
| 4,884,553 A | 12/1989 | Schwarzbacker | |
| 4,924,072 A | 5/1990 | Oslin | |
| 5,411,753 A | 5/1995 | Tippmann | |
| 5,619,983 A | 4/1997 | Smith | |
| 6,063,421 A * | 5/2000 | Barravecchio | A47J 37/1219 99/332 |
| 6,904,903 B1 * | 6/2005 | Vroom | A21B 3/04 219/400 |
| 7,049,551 B2 | 5/2006 | Williams et al. | |
| 7,060,941 B1 | 6/2006 | Embury et al. | |
| 7,087,873 B2 | 8/2006 | Hayakawa et al. | |
| 7,208,701 B2 | 4/2007 | Fraccon et al. | |
| 7,304,278 B2 | 12/2007 | Kanzaki et al. | |
| 7,487,714 B2 * | 2/2009 | Andoh | F24C 15/327 219/401 |
| 7,967,002 B2 | 6/2011 | Inada et al. | |
| 8,997,638 B2 | 4/2015 | Park et al. | |
| 10,502,427 B2 | 12/2019 | Donarski | |
| 10,561,277 B1 | 2/2020 | Swayne et al. | |
| 2005/0006382 A1 * | 1/2005 | Hayakawa | H05B 6/6405 219/757 |
| 2006/0011607 A1 * | 1/2006 | Cho | F24C 15/327 219/400 |
| 2006/0090741 A1 | 5/2006 | Bowles et al. | |
| 2009/0218332 A1 | 9/2009 | Negandhi et al. | |
| 2009/0250452 A1 | 10/2009 | Tse | |
| 2014/0151362 A1 | 6/2014 | Johnson et al. | |
| 2014/0205727 A1 | 7/2014 | Distaso et al. | |
| 2014/0311360 A1 | 10/2014 | Bartelick et al. | |
| 2014/0319119 A1 | 10/2014 | Raghavan et al. | |
| 2015/0354827 A1 * | 12/2015 | Faraldi | A47J 27/04 219/403 |
| 2016/0220057 A1 | 8/2016 | Smith et al. | |
| 2016/0327280 A1 * | 11/2016 | Smith | F24C 7/087 |
| 2017/0311394 A1 * | 10/2017 | Shibuya | A47J 27/04 |
| 2017/0343221 A1 * | 11/2017 | Swayne | F24C 15/327 |
| 2019/0110640 A1 | 4/2019 | Te Velde et al. | |
| 2020/0011536 A1 * | 1/2020 | Swayne | F24C 15/003 |

FOREIGN PATENT DOCUMENTS

| | | |
|---|---|---|
| EP | 2028424 | 2/2009 |
| EP | 2088370 | 8/2009 |
| JP | 4476881 | 1/2007 |
| JP | 5050676 | 12/2008 |
| JP | 2009002628 | 1/2009 |
| JP | 6000422 | 2/2016 |
| KR | 100634789 | 10/2006 |
| KR | 101680521 B1 * | 12/2016 |
| WO | 2013107603 | 7/2013 |
| WO | 2020009848 | 1/2020 |

OTHER PUBLICATIONS

Partial International Search Report and Provisional Opinion in PCT/US2022/022266, dated Jun. 27, 2022, 18, pages.
International Search Report and Written Opinion in PCT/US2022/022266, dated Sep. 29, 2022, 30 pages.

\* cited by examiner

STEAM COOKING SYSTEM

FIELD

The present invention relates generally to methods and apparatus for controlling a cooking appliance and, more particularly, for generating steam and regulating the air temperature within an cooking cavity of the cooking appliance during a steam cooking operation.

BACKGROUND

Cooking appliances can include structure for cooking items within an cooking cavity via convection. Moreover, some cooking appliances can include structure for baking items within the cooking cavity. Furthermore, some cooking appliances include structure for steam-cooking items within the cooking cavity. It is desirable to have structure and methodology for controlling a cooking appliance during steam cooking, convection cooking, and/or baking operations in an efficient and effective manner.

SUMMARY

Disclosed herein are example embodiments of improved steam ovens and methods for operating steam ovens with steam-assisted cooking processes.

In a first embodiment, the steam oven includes a cooking cavity, a convection system adjacent a rear wall of cooking cavity, the convection system including a convection heating element and a convection fan together constituting convection elements, a water reservoir at the base of the cooking cavity, and a gas-bake element beneath the water. Operating this steam oven with a steam-assisting cooking process includes selectively operating a gas heating element below a water reservoir at the bottom of a cooking cavity with water present therein, a convection heating element in the cooking cavity, and a convection fan adjacent the cooking cavity in order to achieve and maintain a predetermined cooking temperature within the cooking cavity. Specifically, the method includes receiving water in the reservoir, executing one or more preheat stages, and executing one or more postheat stages. The one or more preheat stages include collectively: energizing the gas-bake element but not the convection elements during an initial preheat period and thereafter energizing the gas-bake element and the convection elements until the temperature in the cavity reaches a setpoint temperature. The one or more postheat stages include collectively: energizing the convection elements and the gas-bake element during an initial postheat period and thereafter energizing the convection elements alone when the cavity temperature is at least the setpoint temperature and energizing the convection elements and the gas-bake element when the cavity temperature is below the setpoint temperature.

In a second embodiment, there is preferably no heating element below a water reservoir in the cooking cavity. The reservoir includes at least a portion that is inclined such that a depth thereof increases in a direction toward a rear wall defining the cooking cavity. A convection heating system similar to that of the first embodiment is configured to direct heating air such that it impinges directly on a surface of the water reservoir. A convection system can be operated in order to direct heated air such that it impinges directly on water in the water reservoir, thereby converting the water to steam. Whether or not a heating element is below the water reservoir, the steam baking process is operated without utilizing this bottom heating element.

DETAIL DESCRIPTION

The term "energized" as used herein when describing a heating system, or more specifically a heating element of the heating system, refers to a state in which chemical or electrical energy (e.g., in the form of combustible fuel, current, etc.) is actively being supplied to the heating element and is converted therein to thermal energy for cooking food. The term "energized" does not refer to a state in which the heating element may be dissipating or radiating heat from residual thermal energy stored therein but is not being actively supplied with energy. For example, a resistance heating element may continue to dissipate or radiate heat from residual thermal energy therein even after it is no longer being energized and thus is not being supplied with electrical current.

It is also to be noted that the term "energized" as used herein in relation to a fan similarly means that energy is being actively supplied to the fan to drive its operation to generate air flow. The term "energized" does not refer to a state in which the fan, no longer supplied with energy, nevertheless continues to generate flow based on residual energy (e.g. stored in a rotating impeller) that continues to motivate air flow until that stored energy has been dissipated.

When the term "energized" is used herein in relation to a heating element or a fan during a particular stage or phase of a cooking operation, it is to be understood that the element may be energized for all or part of the time during of the stage or phase. More specifically, the heating element or fan can be energized according to one or more specific duty cycles during the particular stage or phase, where the heating element or fan is activated (energized) for a certain period of time and off for a certain period of time in a cyclical fashion. For example, the heating element can be energized for 30 seconds and then not energized for 30 seconds cyclically during a particular stage or phase. Alternatively, the heating element can be energized throughout the particular stage or phase. Typically heating elements and fan(s) are energized according to a timed duty cycle (usually 60 seconds) wherein they are energized and de-energized, respectively, during different portions of each cycle as known in the art. Multiple such elements/fans can be energized simultaneously, alternatively, or in an overlapping fashion during the cycle, depending on the requirements of the associated algorithm that executes the particular stage or phase.

First Embodiment

An example cooking appliance 10 is shown in FIGS. 1-6. The appliance 10 includes a housing 12 that supports a cooking chamber 14. The cooking chamber 14 has a bottom wall 20, a top wall 22, a pair of opposing side walls 24, 26, and a rear wall 28 that collectively define an cooking cavity 32. The cooking appliance 10 further includes a door 34 that can provide selective access to the cooking cavity 32 through an opening 36 defined at the front of the cooking chamber 14.

The cooking appliance 10 includes a convection heating system 40 for heating air within the cooking cavity 32 via convection. As discussed further below, the convection heating system 40 can be controlled to perform a steam cooking operation. The convection heating system 40 can include one or more convection heating elements and one or more fans associated with the convection heating element(s) for guiding air across the convection heating element(s). For instance, in the present example the convection heating system 40 includes one convection heating element 42 and one fan 44 associated with the convection heating element 42 for guiding air across the convection heating element 42. However, in other examples, the convection heating system 40 may have one convection heating element 42 associated with multiple fans 44, multiple convection heating elements 42 associated with the same fan 44, and/or multiple convection heating elements 42 that are each associated with one or more different fans 44. The convection heating element 42 can be an electric-resistance element (e.g., coil) that generates heat via an electric current. Alternatively, the convection heating element 42 can be some other element (e.g., a gas burner assembly) that can be energized to produce heat for cooking that can be circulated within the cooking cavity air via convection. The fan 44 may be located downstream from the convection heating element 42 to draw (i.e., suck) air past the convection heating element 42, or the fan 44 may be located upstream from the convection heating element 42 to push (i.e., blow) air past the convection heating element 42. The fan 44 can be configured to be operated at multiple speeds, e.g. a low speed and a high speed. Multiple speed settings allow the convection system to be operated in a variety of cooking operations that may benefit from different air flow rates. Additionally, the fan of the convection system can be used to circulate air during other operations, such as a self-cleaning operation or an exhaust operation. Such operations also may benefit from speed settings that are different than those desired for cooking operations.

Figure 5:
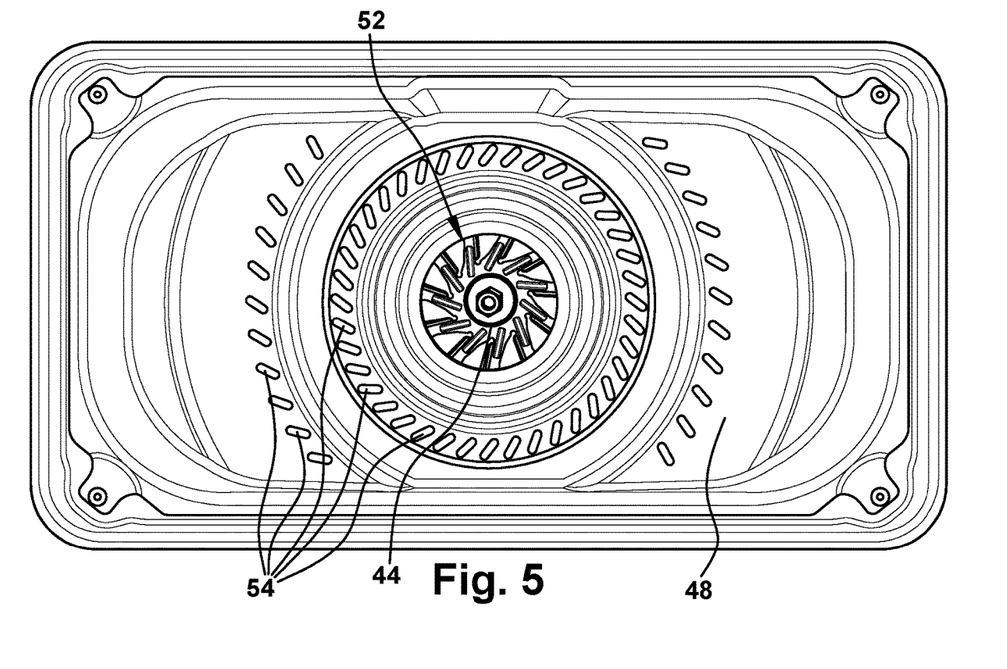
FIG. 5 shows a convection system of the cooking appliance of FIG. 2.
Figure 6:
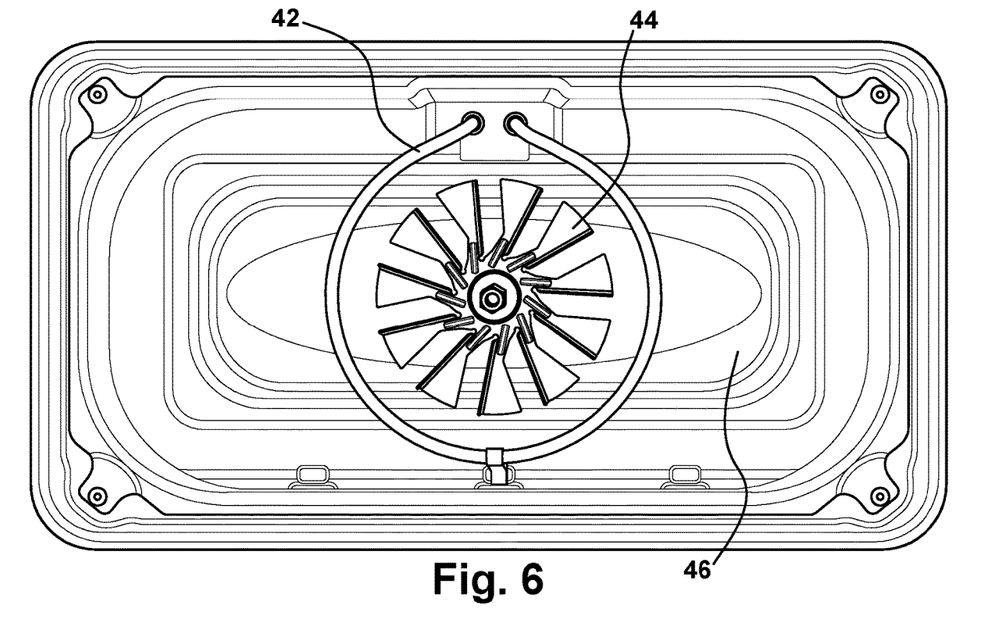
FIG. 6 shows the convection system of FIG. 5 with a convection cover thereof removed.

The convection heating system 40 may be located within the cooking cavity 32 or it may be located outside of the cooking chamber 14 and fluidly coupled with the cooking cavity 32 via one or more air passageways. In some examples, the cooking chamber 14 may form part of the convection heating system 40. In the present example, the convection heating system 40 has a mounting area 46 attached to the rear wall 28 of the cooking chamber 14. The convection heating element 42 and fan 44 are attached to the mounting area 46. The convection heating system 40 further includes a cover 48 that is attached to the mounting area 46 to define a partially enclosed space in which the convection heating element 42 and fan 44 are housed. As the fan 44 is operated, air is drawn from the cooking cavity 32 into the space where the fan 44 is housed via one or more inlets 52 in the cover 48. The air is then guided past the convection heating element 42 and blown through one or more outlets 54 in the cover 48 back into the greater cooking cavity 32 outside of the convection cover 48. In the illustrated embodiment, the cover 48 includes a single inlet 52 for guiding air radially to the center of the fan 44 and a plurality of outlets 54 for directing air expelled by the fan 44 throughout the cooking cavity 32. The outlets 54 can be oriented at numerous angles in order to promote uniform air circulation or turbulence circulate heated air throughout the entire cooking cavity 32 in order to achieve a substantially uniform temperature profile therein that minimizes hot spots. In other embodiments, the convection heating system 40 may have a variety of configurations of inlet(s) 52 and outlet(s) 54 for guiding air into and out from the space underneath the convection cover where it can be heated by the convection heating element 42 before being expelled by the fan 44.

Figure 1:
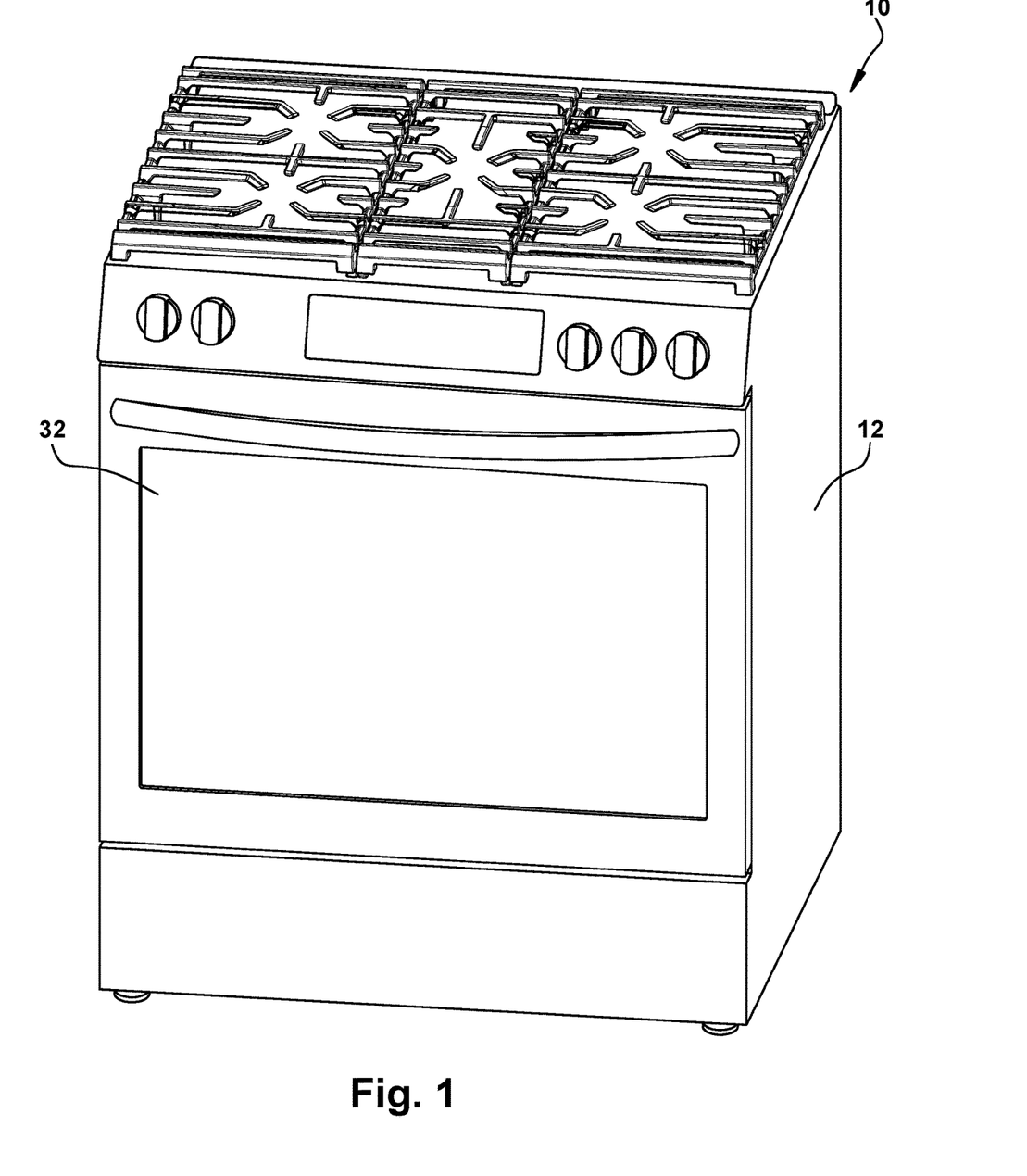
FIG. 1 shows a front perspective view of a cooking appliance according to a first embodiment as described herein.
Figure 2:
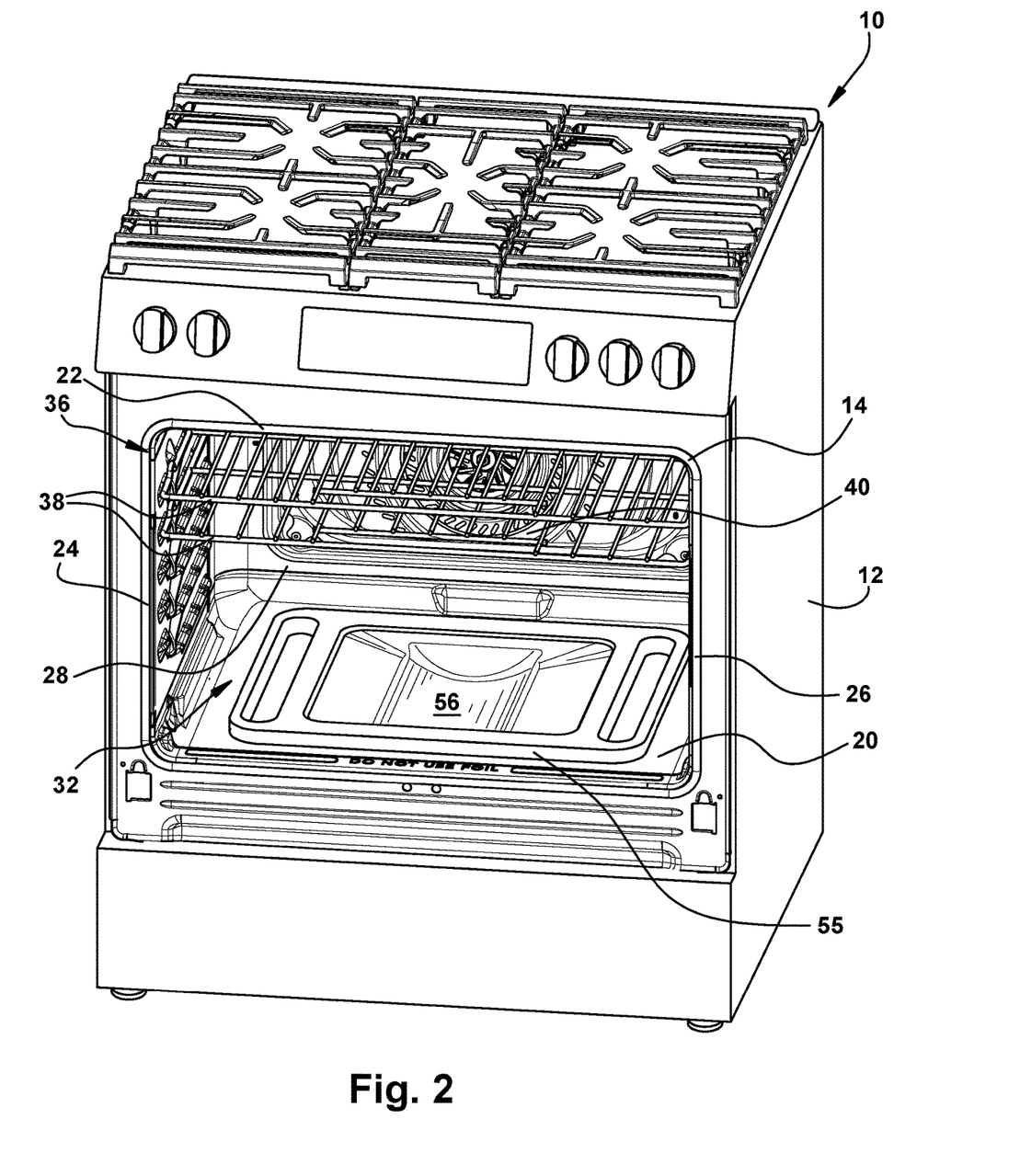
FIG. 2 shows the cooking appliance of FIG. 1 with the door thereof removed.
Figure 3:
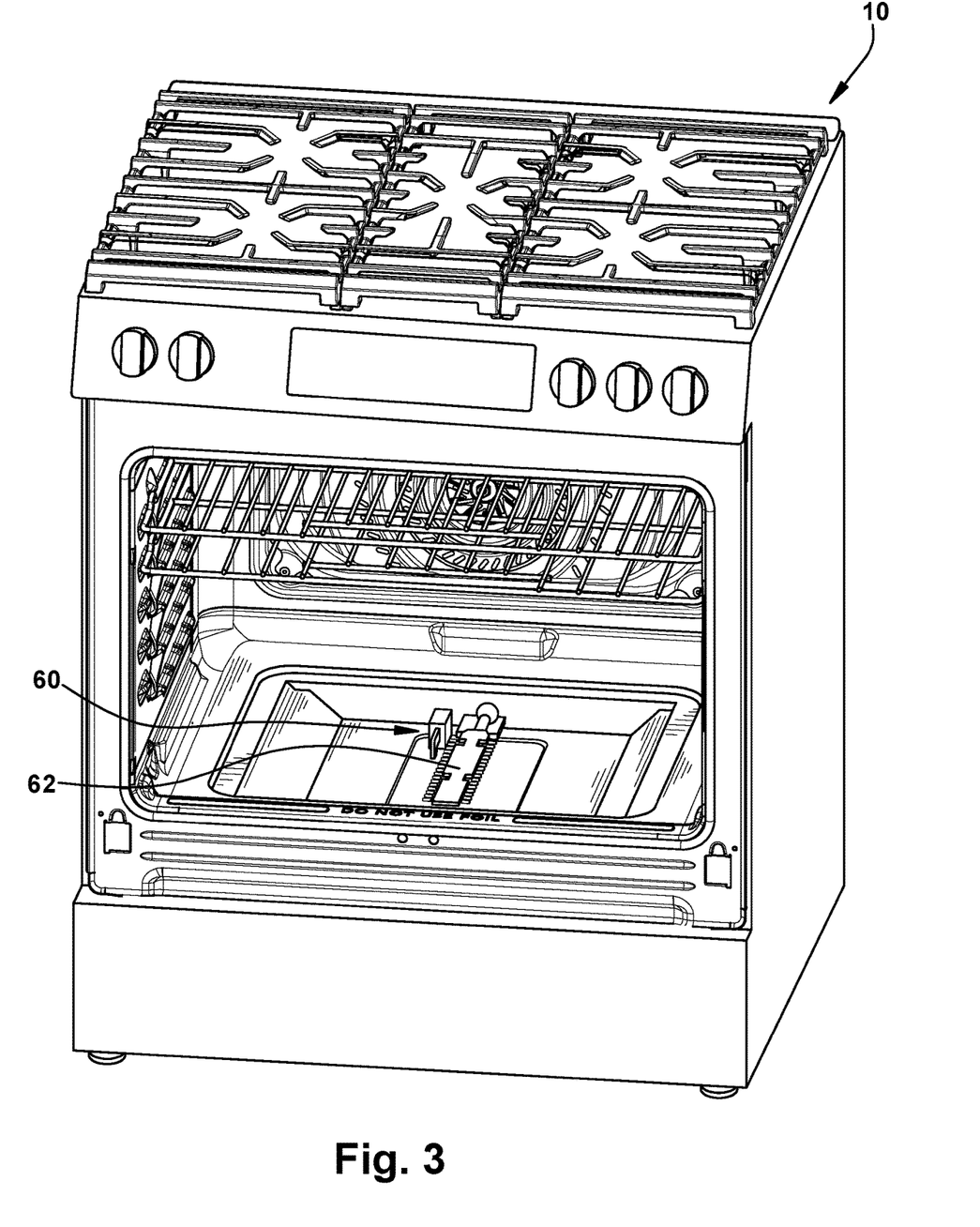
FIG. 3 shows the cooking appliance of FIG. 2 with a water reservoir thereof removed.
Figure 4:
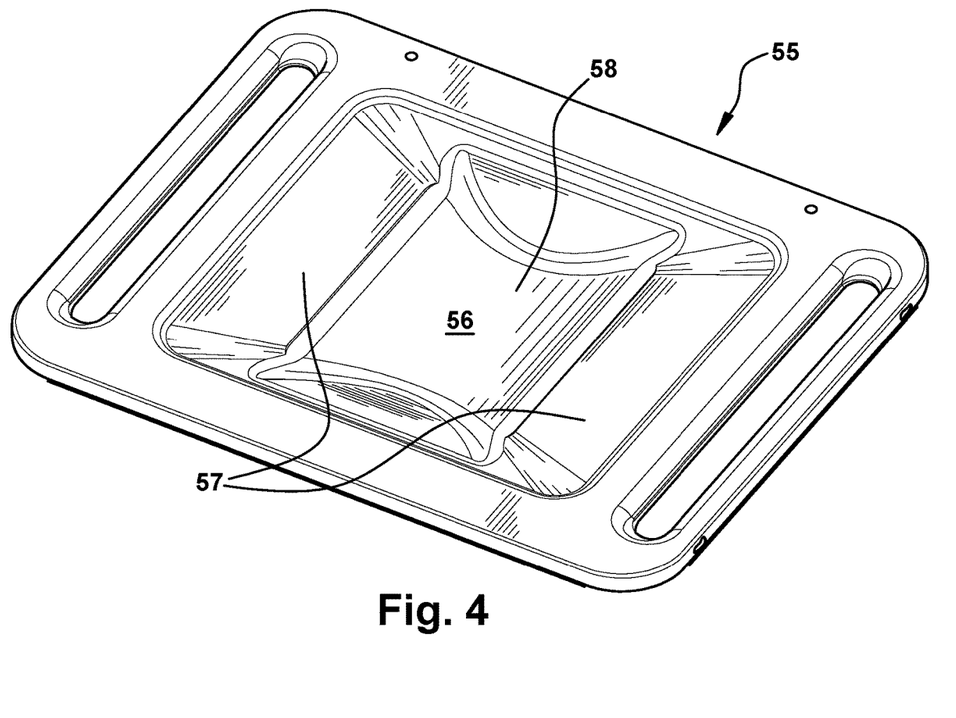
FIG. 4 shows the water reservoir of the cooking appliance of FIG. 2.

The cooking appliance 10 further includes a reservoir plate 55 for holding water in a reservoir 56 thereof that can be heated to generate steam for dispersal throughout the cooking cavity 32. The reservoir 56 is accessible from within the cooking cavity 32 and is preferably sized to hold a maximum of about 12 cups of water, though other volumes are possible. Referring to FIG. 4, the reservoir 56 of the reservoir plate 55 includes inclined portions 57 leading to the deepest portion 58 thereof. This configuration results in water remaining in the deepest portion 58 of the reservoir 56 as the water is heated to steam. The deepest portion 58 is in the middle of the reservoir 56 and thus adjacent to the bottom outlets 54 of the convection cover 48. In some examples, the reservoir 56 is disposed at a base of the cooking chamber 14 and, in particular, is formed at least partially from the base of the cooking chamber 14. For instance, in the illustrated embodiment the reservoir 56 is formed at the base of the cooking chamber 14 as a recess or well in the bottom wall 20 of the cooking chamber 14, which may be formed by metal bending, stamping, embossing, or other suitable techniques. Optionally, it can be fabricated via affixation of a plurality of distinct components, though this may be less preferred due to the potential for water leakage via affixation (e.g. weld) seams between adjacent components. The reservoir 56 effectively can be a sump of the cooking chamber 14 located at its base. However, the reservoir 56 may be disposed at other locations and/or may form other portions of the cooking chamber 14.

The cooking appliance 10 further includes a baking system 60 that can be controlled to perform a baking operation. The baking system 60 can include one or more heating elements 62, that are located exterior of the cooking cavity 32 below the bottom wall 20 of the cooking chamber 14. However, the baking system 60 may include any number of heating elements in other examples. The heating element 62 of the baking system 60 are configured to be energized to provide heat for the cooking chamber 14 during the baking operation. As shown in the figures, the heating element 62 is a gas-burning heating element, or burner. In operation, gas is delivered to the burner 62 which is ignited in order to provide thermal energy to the cooking cavity 62, e.g. as part of a baking operation.

Where the heating element 62 is a gas burner, industry regulations may require that the electric heating element 42 of the convection heating system 40 have a relatively low power to prevent accidental ignition of gas being supplied to the oven. For example, the convection heating element 42 can have a power of 500 W to 1500 W, preferably 650 W to 1350, and most preferably 800 W to 1200 W, e.g. 1000 W.

Additionally, based on the position of the heating element (s) 62 of the baking system 60, it can also be controlled as part of a steam cooking operation. Specifically, the position of the heating element(s) 62 below the reservoir 56 can allow it/them to be energized in order to heat water stored in the reservoir 56 to steam. Water in the reservoir 56 can be heated by thermal energy emitted by the energized heating element 62, thereby raising the temperature thereof. A portion of this thermal energy is thereafter passed to the air within the cooking cavity 32 from the water, thereby raising the temperature of the air. As the heating element 62 continues to be energized, the temperature of both the water in the reservoir 56 and the air within the cooking cavity 32 is raised, as the water temperature approaches its boiling point. When the boiling point is reached, steam is produced and rises into and mixes with the air in the cooking cavity 32.

In some examples, the reservoir 56 may be an open reservoir provided at a base of the cooking chamber 14 such that the reservoir 56 is open to the cooking cavity 32 and the surface of the water 58 in the reservoir 56 is exposed to the cooking cavity 32. Moreover, the cooking appliance 10 can include a shroud (for example, as can be seen in U.S. Patent Publication No. 2017/0343221, which is incorporated herein by reference) that can be arranged within the cooking cavity 32 to at least partially cover the reservoir 56 and the exposed surface of the water.

First Example Cooking Operation

Figure 7:
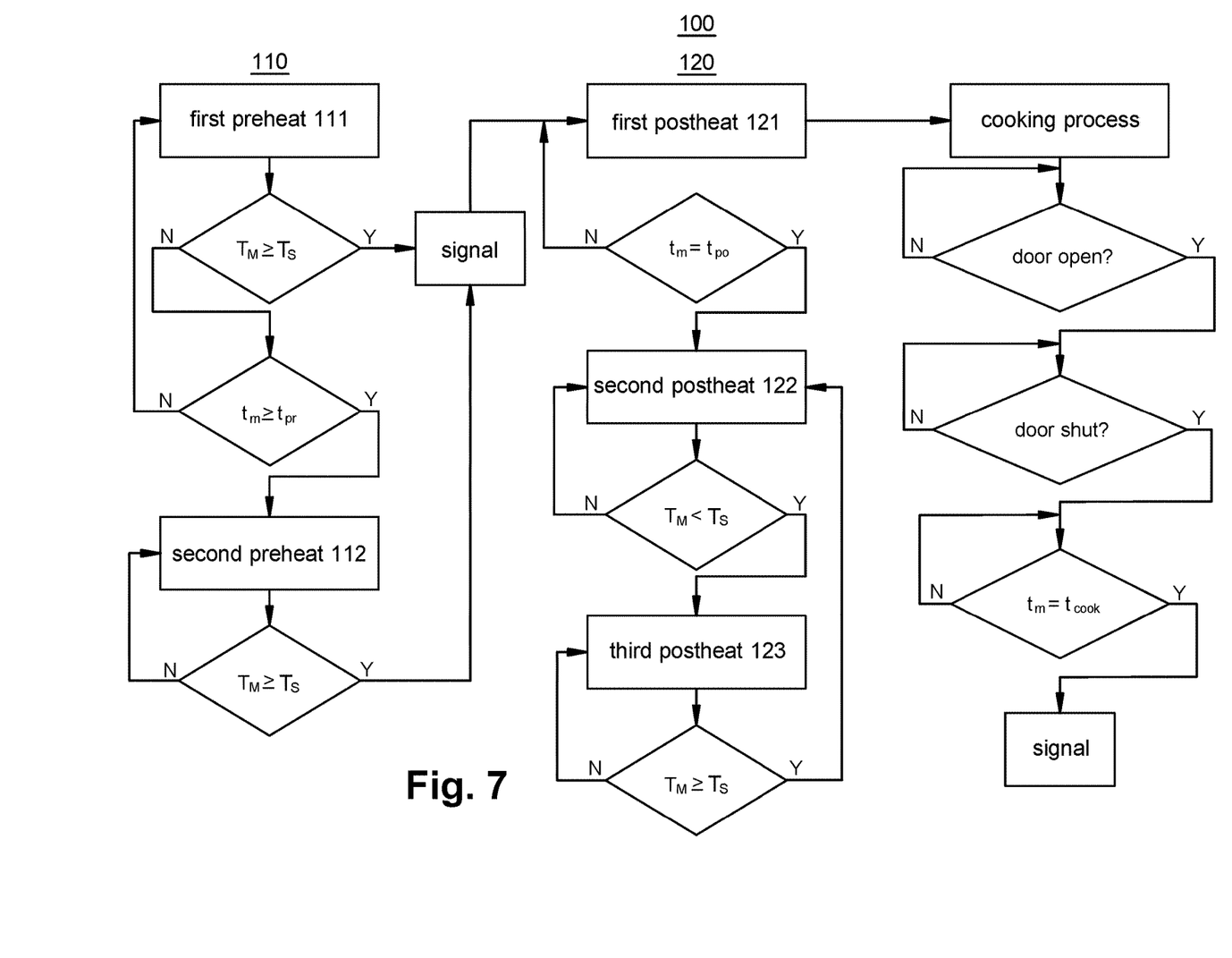
FIG. 7 shows a flow chart of a first example cooking operation as described herein.

Turning now to FIG. 7, a first example cooking operation 100, which can also be referred to as a steam baking operation, of the cooking appliance 10 will now be described. The steam baking operation 100 involves selectively operating at least one burner 62 of the baking system 60 (ideally with water is in the reservoir 56), at least one electric heating element 42 of the convection system 40, and at least one fan 44 of the convection system 44. As discussed below, all of the foregoing are operated to establish, maintain, and re-establish a desired cavity temperature, e.g. a cooking temperature in the baking operation 100. The burner 62 is utilized to help control the cavity temperature because the electric convection heating element 42 does not have enough power by itself to adequately heat the cooking cavity 32.

As mentioned above, ideally the water for generating steam will be pre-filled into the reservoir when or before the operation begins. This is because adding water later may result in spontaneous vaporization that could flash out from the reservoir 56. Additionally, adding cold water to a hot reservoir 56 can also lead to cracking and crazing of the reservoir, which is also undesirable. With water prefilled into the reservoir 56, as mentioned above thermal energy from the burner 62 transfers first primarily to the water in the reservoir 56 and thereafter from the water to the air in the greater cavity 32 volume above the reservoir. This is distinct from other steam-bake operations where the gas-bake element is utilized only to generate steam in the reservoir at the base of the cooking cavity, and not for cavity-temperature regulation. Accordingly, the steam baking operation 100 described herein involves controlling the operation of the aforementioned components together in order to adequately control the temperature of the oven cavity during the steam-baking operation, in addition to using the gas burner 62 to generate steam. Operation in this manner also avoids the aforementioned drawbacks of steam-flashing and crazing that would result from pouring cold water into the heated reservoir.

The steam baking operation 100 can be initiated by selecting this operation on a control panel, e.g., by pressing a button or an area on a touch screen labelled "Steam Bake." After selecting the steam baking operation 100, a steam baking temperature is entered into the control panel, e.g., by pressing a button or an area on a touch screen to select a temperature.

The steam baking operation 100 can include one or more sub-phases, such as a pre-heating phase 110 and a post-heating phase 120. The pre-heating phase 110 is designed for increasing the temperature of the air within the cooking cavity 32 from a first temperature (e.g., room temperature) to a second temperature (e.g., a predetermined temperature). The post-heating phase 120 is designed for regulating (e.g., adjusting and/or maintaining) the temperature of the air within the cooking cavity 32. For instance, the post-heating phase 120 can include maintaining the second temperature achieved during the pre-heating phase 110 for a definite or indefinite period of time. In addition, the post-heating phase 120 can include correcting the temperature of the air within the cooking cavity 32 back to the second temperature if it deviates therefrom, e.g., as a result of the door being opened to place a food item in the cooking cavity.

The pre-heating phase 110 can include one or more sub-stages, such as a first pre-heating stage 111 and a second pre-heating stage 112. The first pre-heating stage 111 is designed for providing an initial amount of thermal energy to the cooking cavity for increasing the temperature of air therein. During this first pre-heating stage 111, at least one gas burner 62 in the baking system 60 is energized in order to provide heat to the cooking cavity 32. The first pre-heating stage 111 lasts until either a predetermined cooking temperature, e.g., the steam baking temperature, $T_S$ is reached or a pre-heating period of time $t_{pr}$ elapses. As depicted in FIG. 7, $T_M$ signifies the measured temperature and $t_m$ signifies the time elapsed. The pre-heating period of time $t_{pr}$ can be selected so that the baking system 60 will provide sufficient heat to the cooking cavity to raise its temperature desirably, but without imparting sufficient heat to water in the reservoir to generate material amounts of steam, or at least to minimize the amount of steam produced. This can be useful to reduce the amount of steam encountered by a user who may open the oven door after preheating is completed, e.g. to insert a baking tray. The pre-heating stage 111 involves the burner 62 providing thermal energy that first raises the temperature of water in the reservoir 56. When the temperature of the water in the reservoir 56 rises, heat therefrom transfers to the air in cooking cavity 32, raising the temperature thereof.

The pre-heating period of time $t_{pr}$ can be a predetermined pre-heating period of time. For example, the predetermined pre-heating period of time can be 2 to 12 minutes, preferably 4 to 10 minutes. Alternatively, the pre-heating period of time can be a time determined based on the amount of water added to the reservoir 56. For example, the control panel can prompt a user to enter how much water will be added to the reservoir 56. The pre-heating period of time can then be determined based on this water amount, e.g. to ensure that it is not long enough to result in transmitting sufficient heat to the water in the reservoir 56 so that the water reaches it saturation point and begins to emit steam. Typically, less water will correspond to a relatively shorter period of time and more water will correspond to a relatively longer period of time.

If the pre-heating period of time elapses prior to the second temperature being reached ($t_m = t_{pr}$), a second pre-heating stage 112 can be initiated. The second pre-heating stage 112 can provide additional thermal energy to the cooking cavity for increasing the temperature of the air therein to reach the second temperature, optionally ensuring, however, that the water in the reservoir still does not reach its saturation (boiling-point) temperature, which can be estimated based on the heating rate of the heating element(s) used and the known (user-entered) quantity of water in the reservoir, and/or via a temperature sensor that samples the water temperature. In this stage, at least one heating element 42 of the convection system 40 and at least one burner 62 of the baking system 60 are energized in order to provide additional heat to the cooking cavity 32. Moreover, at least one fan 44 of the convection system 40 is energized in order to circulate air within the cooking cavity 32. The thermal energy from the heating elements of the convection system and the baking system heat the air in the cooking cavity such that the temperature thereof rises. The second pre-heating stage continues until the second temperature has been reached.

Once the second temperature has been reached ($T_M \geq T_S$), either during the first pre-heating stage 111 or the second pre-heating stage 112, the pre-heating phase 110 is complete. Once the second temperature has been reached, the controller can be configured to cause a signal to be made by the oven to alert a user that the second temperature (e.g. a preheating temperature) has been reached. Such a signal can be an audio and/or visual signal, as is known in the art.

As with conventional cooking operations, a user can open the door to place a food item to be cooked in the cooking cavity, e.g., on a cooking rack. Additionally, upon closing the door after placing the food item within the cooking cavity, a user can start a timer corresponding to the desired cook time for the food item. In the steam baking operation 100, these steps of opening/closing the door and entering of a cook time do not affect the remaining stages of the operation.

Particularly, when the pre-heating phase 110 is complete, the post-heating phase 120 begins. Entering a cook time or opening/closing the door, apart from affecting the temperature within the cooking cavity, plays no role in the timing of the post-heating phase 120. In other words, the beginning of the post-heating stage is not predicated on a cook time being entered, or the opening/closing of the door to signify that a food item has been placed therein. The post-heating phase 120 can include one or more sub-stages, such as a first post-heating stage 121, a second post-heating stage 122, and a third post-heating stage 123.

When the post-heating phase 110 is initiated, the first post-heating stage 121 begins. The first post-heating stage 121 is designed to maintain the second temperature with the cavity 32, or re-establish the second temperature if the temperature falls while the door is open. During the first post-heating stage 121, at least one heating element 42 of the convection system 40 and at least one burner 62 of the baking system 60 are energized in order to maintain the temperature within the cooking cavity 32. Moreover, at least one fan 44 of the convection system 40 is energized in order to circulate air within the cooking cavity to assist in maintaining the temperature within the cooking cavity. The first post-heating stage lasts until a post-heating period of time $t_{po}$ elapses. The post-heating period of time can be a predetermined period of time. For example, the predetermined post-heating period of time can be 4 to 16 minutes, preferably 6 to 14 minutes. Alternatively, the post-heating period of time can be a time determined based on the amount of water added to the reservoir and/or the cooking temperature. For example, as discussed above, the control panel can prompt a user to enter how much water is added to the reservoir at the beginning of the steam baking operation. The post-heating period of time can then be determined based on the amount of water added, as well as the cooking temperature of the steam baking operation. This can ensure, for example, that the post-heating period of time does not extend beyond a time period that would result in the water in the reservoir boiling dry, and can be estimated or calculated based on the amount of water in the reservoir at the beginning of the operation, and the heating rate(s) of the heating element(s) used in the cooking stages. Typically again, less water can correspond to a relatively shorter period of time and more water can correspond to a relatively longer period of time. Also, a higher cooking temperature can correspond to a relatively shorter period of time and a lower cooking temperature can correspond to a relatively longer period of time, again because higher temperatures will result in higher heating rates and vice versa, which are to be taken into account to determine at what point the water in the reservoir for a steam-cooking operation will boil dry.

When the post-heating period of time elapses ($t_m = t_{po}$), a second post-heating stage 122 can be initiated. The second post-heating stage 122 is designed to continue to maintain the second temperature with the cavity, while at the same time minimizing the amount of energy expended. In this stage, fewer heating elements are energized than in the first post-heating stage 121. For example, at least one convection heating element 42 of the convection system 40 and at least one fan 44 of the convection system 40 are energized, but preferably none of the burner(s) 62 of the baking system 60 are utilized. The thermal energy from the convection heating element(s) 42 is circulated by the at least one convection fan 44 in order to continue to maintain the cooking temperature within the cooking cavity 32. However, despite the operation of at least one convection heating element 42, the temperature within the cooking cavity 32 might fall. There are a number of reasons that the temperature within the cooking cavity 32 might fall. For example, a user might open the oven door in order to visually inspect a food item being cooked or to temporarily remove the food item from the oven in order to determine whether it has been cooked to the satisfaction of the user. As will be readily appreciated, opening the door can cause the temperature to fall as a result of room temperature air replacing heated air in the cooking cavity as the heated air escapes via the open door. Additionally, the aforementioned low power of the convection heating element 42 might not be sufficient to maintain a particular cooking temperature indefinitely, particularly where the cooking temperature is high. Thus, the second post-heating stage lasts until the measured temperature falls below the cooking temperature, as determined by a temperature sensor that samples the air in the cooking cavity.

If the measured temperature falls below the cooking temperature ($T_M < T_S$), a third post-heating stage 123 is initiated. The third post-heating stage 123 is designed to return the measured temperature in the cooking cavity to the cooking temperature. In this stage, more heating elements are energized than in the second post-heating stage 122. For example, at least one heating element and at least one fan of the convection system are energized, along with at least one heating element of the baking system, in order to return the temperature within the cooking cavity to the cooking temperature. The thermal energy from the convection system and the additional thermal energy provided by the baking system heats the air within the cooking cavity such that the temperature therein rises. The third post-heating stage lasts until the measured temperature is at or exceeds the cooking temperature ($T_M \geq T_S$). When the measured temperature is at or exceeds the cooking temperature, cooking operation reverts to the second post-heating stage 122. The second post-heating stage 122 and third post-heating stage 123 can continue to operate cyclically in this manner until the steam baking operation is terminated, either manually or based on an elapsed cook time. If the latter, then when the cook time has elapsed a signal can be provided to the user. Such a signal can be an audio and/or visual signal, as is known in the art.

Second Example Cooking Operation

Figure 8:
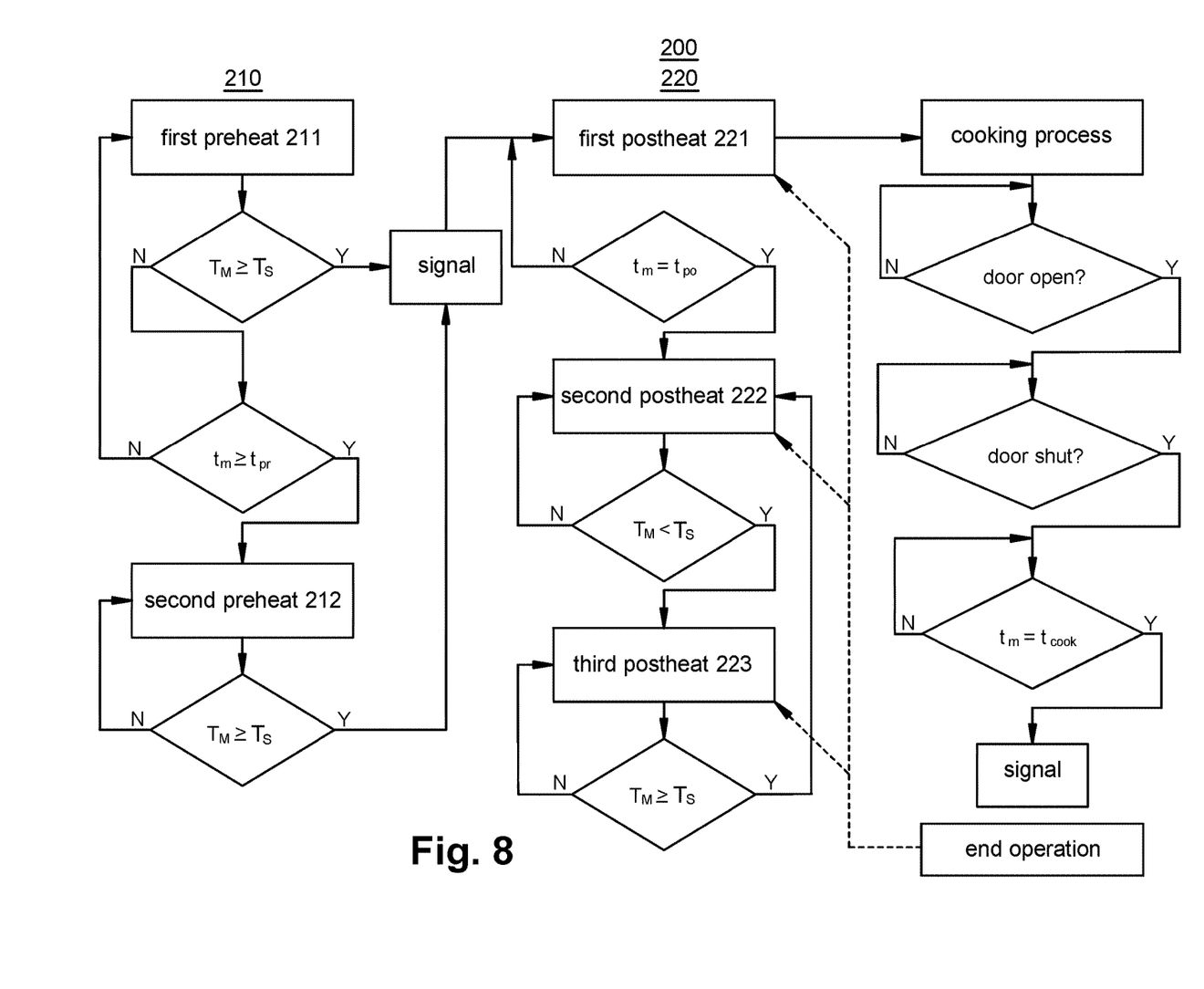
FIG. 8 shows a flow chart of a second example cooking operation as described herein.

Turning now to FIG. 8, a second example cooking operation 200, which can also be referred to as a timed steam baking operation, of the cooking appliance 10 will now be described. The timed steam baking operation 200 can be initiated by selecting this operation on a control panel, e.g., by pressing a button or an area on a touch screen labelled "Timed Steam Bake." After selecting the timed steam baking operation 200, a steam baking temperature is entered into the control panel, e.g., by pressing a button or an area on a touch screen to select a temperature for the timed steam baking operation 200. Unlike the "Steam Bake" of the first example cooking operation 100, the "Timed Steam Bake" involves entering a steam baking time after the steam baking temperature is selected, e.g., by pressing a button or an area on a touch screen to select a cook time for the timed steam baking operation 200.

Similar to the above-described steam baking operation, the instant timed steam baking operation 200 can include one or more sub-phases, such as a pre-heating phase 210 and a post-heating phase 220. These pre-heating and post-heating phases 210 and 220 are largely the same as the phases 110 and 120 described above. To the extent they are the same, they will not be described. However, there are some difference between the respective operations 200 and 100, particularly during the post-heating phase.

As with the operation 100, the operation 200 involves alerting a user that pre-heating phase 210 has been completed. When the pre-heating phase 210 ends, the post-heating phase 220 immediately begins. Once the pre-heating phase ends, a user can open the door to place a food item to be cooked in the cooking cavity 32, and upon closing the door the cook time entered at the outset of the timed steam baking operation 200 begins to toll for the post-heating phase 220. Alternatively, instead of being based on the closing of the door, a user can press a button on the control panel to signify that the food item has been placed in the cooking cavity 32 such that the cook time can begin tolling. The post-heating phase 220 operates the same as the post-heating phase 120 as the cook time tolls. However, when the cook time is completed, the post-heating phase 220, and thus the operation 200, ends. All the heating elements and fan(s) cease being energized, and the user is alerted that the operation 200 is complete. A user can immediately remove the food item, or the food item can remain in the oven while the temperature gradually falls as a result of heat transfer into the surrounding environment. Such a "Timed Steam Bake" cooking operation may be desirable for certain food types, e.g. vegetables or bread, where it may be desirable to have the food item remain in the steam environment of the cooking cavity 32 past the time it has finished being actively cooked.

Second Embodiment

Figure 9:
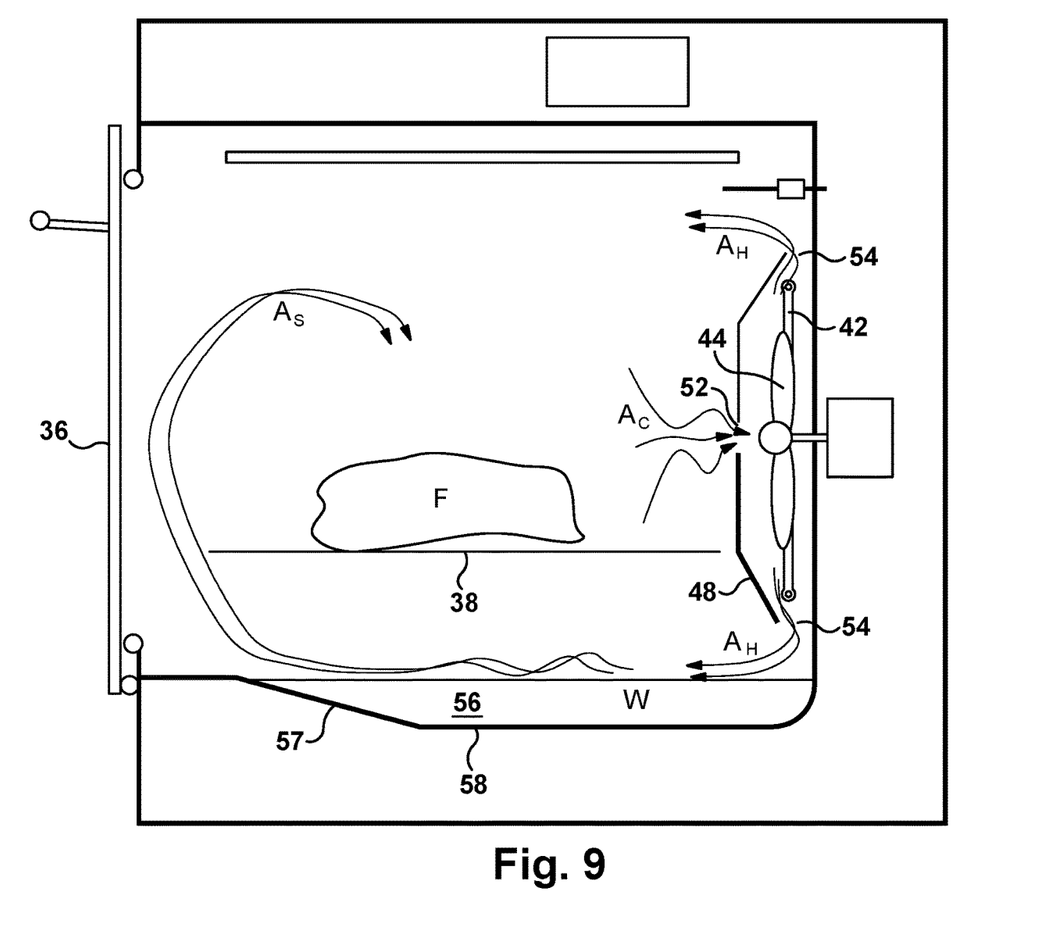
FIG. 9 shows a side view of a cooking appliance according to a second embodiment as described herein.

An example cooking appliance 10 according to a second embodiment is shown in FIG. 9. Many of the features are the same as or similar to the components of the first embodiment. Thus, they will not be described in the same level of detail as described above, as it can be assumed that the same details are present here unless stated otherwise. As with the first embodiment, the appliance 10 of the second embodiment includes a housing 12 that supports a cooking chamber 14. The cooking chamber 14 has a bottom wall 20, a top wall 22, a pair of opposing side walls 24, 26, and a rear wall 28 that collectively define an cooking cavity 32. The cooking appliance 10 further includes a door 34 that can provide selective access to the cooking cavity 32 through an opening 36 defined at the front of the cooking chamber 14.

As also with the first embodiment, the cooking appliance 10 of the second embodiment includes a convection heating system 40 for heating air within the cooking cavity 32 via convection. The convection heating system 40 can include at least one heating element 42, e.g. an electric heating element, and at least one fan 44. Alternatively, the convection heating element 42 can be some other element (e.g., a gas burner assembly) that can be energized to produce heat for cooking that can be circulated throughout the cooking cavity air via convection.

As shown in FIG. 9, the cover 48 of the second embodiment includes an inlet 52 for guiding air axially to the center of the fan 44 and a plurality of outlets 54 for directing air expelled by the fan 44 radially out from the cover 48 so that it can circulate throughout the cooking cavity 32. The cover 48 can be the same or similar to the cover 48 shown in FIG. 5. Thus, the outlets 54 extend around the circumferences of the cover 48, particularly the bottom thereof, such that air is directed thereby in several directions away from the cover. The bottom outlets 54 allow heated air from the convection system 40 to be directed toward water in the reservoir 56, as discussed in more detail below.

The cooking appliance 10 further includes a reservoir 56 for holding water that can be heated to generate steam for dispersal throughout the cooking cavity 32. The reservoir 56 is accessible from within the cooking cavity 32 and except as described below is similar to the reservoir discussed in the earlier embodiment.

In contrast to the first embodiment, the instant embodiment is configured to operate a steam cooking process without utilizing a bottom baking system; i.e. without utilizing any heating elements disposed beneath the cooking cavity or the reservoir. A bottom baking system can be present but not utilized during the steam cooking process, or it can be omitted. In the embodiment shown in FIG. 9, there is no bottom baking system; i.e. no heating elements disposed beneath the cooking cavity or reservoir. As will be appreciated and as discussed above with respect to the first embodiment, when present the proximity of such a baking system 20 to the reservoir 56 (see FIG. 3 for the first embodiment) results in the baking system 20 providing a predominant amount of the thermal energy that heats the water therein to steam. Conversely, all of the thermal energy supplied to water in the reservoir 56 to convert it to steam is supplied by the convection system 40.

To ensure adequate steam generation, the convection system 40 can be configured to direct air flow directly into the reservoir 56, such that heated air exhausted from the convection cover by the fan is directed so as to impinge directly against the surface of water within the reservoir without encountering or being redirected by other elements in the cooking cavity; i.e. via a direct line-of-sight pathway from exiting the convection cover to the water surface. Specifically, as discussed above, the cover of the convection system 40 is configured to have openings 54 on a bottom side thereof such that air flow can be directed downwards toward the reservoir 56 thereby promoting heat transfer between the heated air and the water therein.

Figure 10:
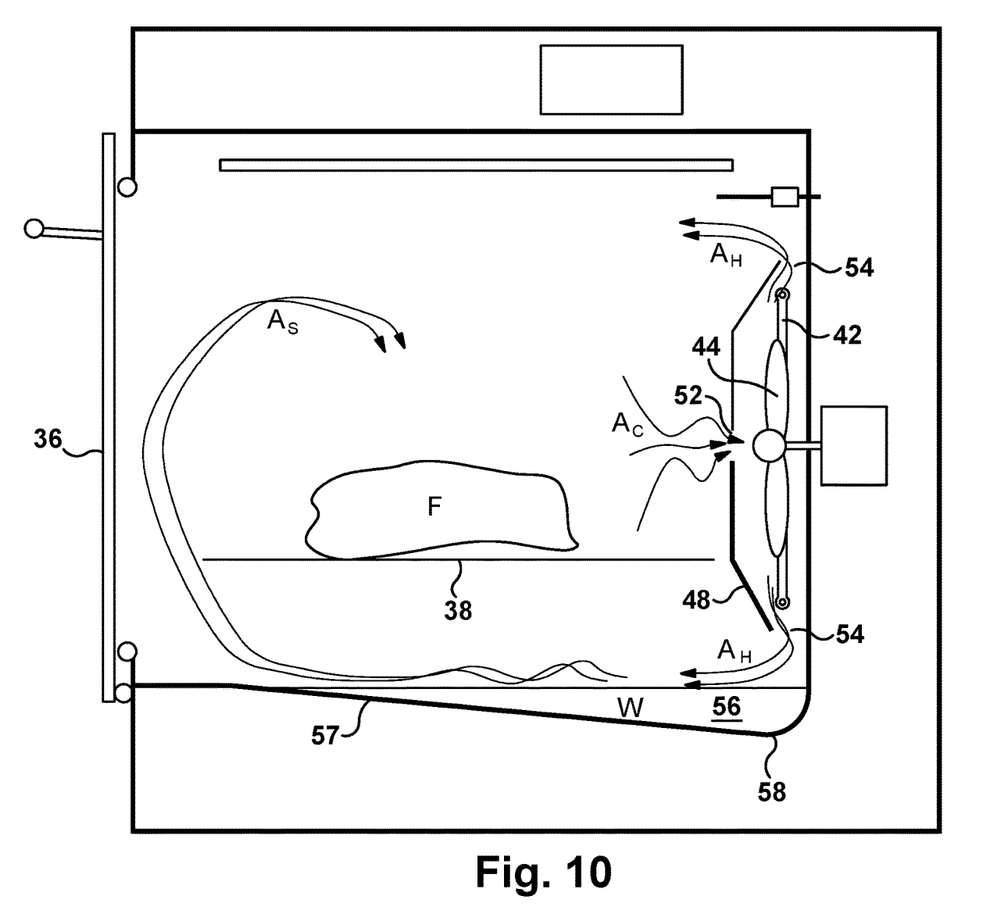
FIG. 10 shows a side view of a cooking appliance according to the second embodiment with an alternately-shaped water reservoir as described herein.

Similarly, the reservoir can be configured such that the deepest portion 58 of the reservoir 56 is located where the impinging air flow from the convection system directly impacts the water surface, typically at the rear of the reservoir adjacent to the rear wall of the cooking cavity. To achieve this, at least a portion of the bottom wall of the reservoir can be an inclined portion 57 inclined downward toward the portion of the reservoir where air from the convection system will impinge as described above. In embodiments, a forward portion of the reservoir bottom wall will be inclined downward toward a rear of the reservoir, so water therein will pool and be deepest toward the rear of the reservoir, where convection air impinges its surface 5. This is shown in FIG. 9, where the front-most portion of the bottom wall of the reservoir 56 is inclined to promote water pooling toward the rear of the reservoir 56. Alternatively, a larger portion of the bottom wall of the reservoir can be inclined, e.g. all the way or nearly all the way to the rear wall of the reservoir as depicted in FIG. 10.

As a result of the absence of a bottom baking element, the space of the cooking cavity 32 of the second embodiment can be larger than that of the first embodiment. Additionally, because there is not a bottom burner that operates via gas, the convection heater 42 of the second embodiment can be higher power such that it can adequately heat the cooking cavity 32 to desired temperature without assistance from a bottom baking element.

In operation, the convection heating element 42 and fan 44 are operated, and air within the cooking cavity 32 is heated and circulated by thereby. When water is present in the reservoir 56, some of the heated air impinges the water surface and directly transfers heat thereto, which promotes efficient transfer of thermal energy to the water stored in the reservoir, and eventual conversion thereof to steam upon reaching the saturation temperature (boiling point). Once boiling is achieved, continued delivery of thermal energy via hot-air impingement will sustain steam generation, which then is circulated within the cooking cavity along with heated air via the convection fan. As water continues to be converted to steam, the water level in the reservoir will fall. However, the shape of the reservoir as described above, which ensures that water will pool and be deepest at the location where hot air impinges its surfaces, provides efficient usage of water in the reservoir and ensures that thermal energy from the convection system effectively is transferred to the water remaining in the reservoir, at a location where the mass of that water is pooled and concentrated.

Third Example Cooking Operation

A third example cooking operation, which can also be referred to as a steam convection operation, of the cooking appliance 10 will now be described. The steam convection operation can be initiated by selecting this operation on a control panel, e.g., by pressing a button or an area on a touch screen labelled "Steam Convection." After selecting the steam convection operation, a steam convection temperature is entered into the control panel, e.g., by pressing a button or an area on a touch screen to select a temperature.

The steam convection operation can include one or more sub-phases, such as a pre-heating phase and a post-heating phase. The pre-heating phase is designed for increasing the temperature of the air within the cooking cavity 32 from a first temperature (e.g., room temperature) to a second temperature (e.g., a predetermined preheat temperature). The post-heating phase is designed for regulating (e.g., adjusting and/or maintaining) the temperature of the air within the cooking cavity 32. For instance, the post-heating phase can include maintaining the second temperature achieved during the pre-heating phase for a definite or indefinite period of time. In addition, the post-heating phase can include correcting the temperature of the air within the cooking cavity 32 back to the second temperature if it deviates therefrom, e.g., as a result of the door being opened to place a food item in the cooking cavity. The post-heating phase of a steam convection operation also facilitates the generation and circulation of steam from water in the reservoir using the convection system.

The pre-heating phase can include one or more sub-stages. However, in this embodiment preferably only a single pre-heating stage is utilized. Only a single pre-heating stage is utilized because, in contrast to the first embodiment, the convection system 40 is sufficient to provide the thermal energy required for achieving a predetermined cooking temperature. The pre-heating stage is designed for providing thermal energy to the cooking cavity for increasing the temperature of air therein. During this pre-heating stage, at least one heating element 42 in the convection system 40 is energized in order to provide heat to the cooking cavity 32. Moreover, at least one fan 44 of the convection system 40 is energized in order to circulate air within the cooking cavity 32. The pre-heating stage lasts until either a predetermined cooking temperature, e.g., the steam convection temperature, is reached or a pre-heating period of time elapses. Preferably, the pre-heating stage last until the steam convection temperature has been reached. When a pre-heating period of time is utilized, preferably this period of time is selected to allow the convection system to provide heat to the cooking cavity in order to heat it up, but not sufficient heat to the water in the reservoir to convert appreciable water to steam, or at least to minimizing the amount of steam produced. The pre-heating period of time can be a predetermined pre-heating period of time. For example, the predetermined pre-heating period of time can be 2 to 12 minutes, preferably 4 to 10 minutes. Alternatively, the pre-heating period of time can be a time determined based on the amount of water added to the reservoir 56, which can be user-entered as discussed in an earlier embodiment in order to prevent or minimize production of steam during the pre-heating stage. If multiple pre-heating stages are employed, these can be differentiated by varying the power level of the convection heating element 42 or the duty cycle of the convection heating element 42.

Once the second temperature has been reached or the pre-heating period of time has elapsed, the pre-heating phase is complete. When the pre-heating phase is complete, the controller can be configured to cause a signal to be made by the oven to alert a user that the pre-heating phase is complete. Such a signal can be an audio and/or visual signal, as is known in the art.

Similarly as above, after the pre-heating phase a user can open the door to place a food item to be cooked in the cooking cavity. Additionally, upon closing the door 3, a user can start a timer corresponding to the desired cook time for the food item. Or a previously entered cook-time can be initiated automatically for the ensuing post-heating phase (discussed below). In the steam convection operation, these steps of opening/closing the door and entering of a cook time do not affect the remaining stages of the operation. In other words, the end of the pre-heating stage/beginning of the post-heating stage is not predicated on a cook time being entered, or the opening/closing of the door to signify that a food item has been placed therein.

When the pre-heating phase is complete, the post-heating phase begins. Entering a cook time or opening/closing the door, apart from affecting the temperature within the cooking cavity, plays no role in the timing of the phase-heating phase. In other words, if the oven door is opened, the post-heating phase continues regardless. The post-heating phase can include one or more sub-stages. However, in the example embodiment described, only a single post-heating stage is utilized.

When the post-heating phase is initiated, the post-heating stage begins. The post-heating stage is designed to maintain the second temperature with the cavity 32, or re-establish the second temperature if the temperature falls while the door is open. During the post-heating stage, at least one heating element of the convection system 40 is energized in order to provide thermal energy to maintain the temperature within the cooking cavity 32. Moreover, at least one fan 44 of the convection system 40 is energized in order to circulate air within the cooking cavity 32 to assist in maintaining the temperature within the cooking cavity 32. During the post-heating stage, no heating element(s) below the reservoir 56 is operated. Thus, the thermal energy that heats the water in the reservoir to steam comes entirely from the convection system 40. If multiple post-heating stages are employed, these can be differentiated by varying the power level of the convection heating element 42 or the duty cycle of the convection heating element 42.

When the cook time has elapsed, a signal can be provided to the user. Such a signal can be an audio and/or visual signal, as is known in the art. However, the post-heating stage can continue past the end of the cook time. Specifically, the post-heating stage can last until it is terminated by a user action, i.e. by pressing a cancel or end button on a control panel.

The invention claimed is:

1. A cooking appliance comprising:
   a cooking cavity comprising a rear wall opposite an opening of the cooking cavity;
   a reservoir for holding water at a bottom of the cooking cavity;
   a convection heating system located adjacent to the rear wall of the cooking cavity, and comprising: a convection heating element for heating air within the cooking cavity, a fan for circulating air within the cooking cavity, and a shroud that at least partially covers the convection heating element and the fan;
   wherein the convection heating system is configured to direct at least a portion of the air heated by the convection heating element into the reservoir along a direct line-of-sight on exiting the shroud in order that said portion of the air impinges directly on a surface of water within the reservoir.

2. A method of steam-baking using the cooking appliance according to claim 1, wherein the cooking appliance further includes a gas-bake element beneath the reservoir, the method comprising:
   a) receiving water in the reservoir;
   b) executing a preheat phase including a first preheat stage during which the gas-bake element but not the convection heating element is energized, and thereafter a second preheat stage during which the gas-bake element, the convection heating element, and the fan are energized until a temperature in the cooking cavity reaches a setpoint temperature;
   c) after the preheat phase, executing a postheat phase including a first postheat stage during which the convection heating element, the fan, and the gas-bake element are energized, and thereafter:
      a. a second postheat stage wherein only the convection heating element and the fan are energized when the temperature in the cooking cavity is at least equal to the setpoint temperature; and
      b. a third postheat stage wherein the convection heating element, the fan, and the gas-bake element are energized when the temperature in the cooking cavity is less than the setpoint temperature.

3. The method of claim 2, the second preheat stage immediately following the first preheat stage.

4. The method of claim 2, wherein the second postheat stage is operative when the temperature in the cooking cavity is at least equal to the setpoint temperature; and the third postheat stage is operative when the temperature in the cooking cavity is less than the setpoint temperature.

5. The method of claim 2, wherein the second postheat stage and third postheat stage are operated cyclically based on the temperature in the cooking cavity.

6. The method of claim 2, the first postheat stage further comprising providing a signal that the predetermined cooking temperature has been reached.

7. The method of claim 2, wherein the temperature in the cooking cavity is continuously measured by a temperature sensor in the cooking cavity throughout all the preheat and postheat stages.

8. The method of claim 1, wherein water is introduced directly to the reservoir by a user prior to executing the one or more preheat stages.

9. The method of claim 2, wherein the reservoir is provided adjacent to or formed as part of a bottom wall of the cooking cavity.

10. The method of claim 2, wherein the convection heating element is an electric heating element having a power rating in a range of 500 W to 1500 W.

11. The method of claim 2, the shroud defining at least one inlet and a plurality of outlets for circulating air throughout the cooking cavity.

12. The method of claim 2, the shroud defining an outlet directly above a portion of said reservoir that is configured to direct the air heated by the convection heating element along the direct line-of-sight.

13. The cooking appliance of claim 1, wherein the reservoir is formed in a bottom wall of the cooking cavity.

14. The cooking appliance of claim 1, wherein there is no heating element below the reservoir.

15. The cooking appliance of claim 1, wherein at least portion of the reservoir is inclined such that a depth of the reservoir increases in a direction toward the rear wall and a deepest part of the reservoir is located at a rear-most portion thereof, adjacent to the rear wall of the cooking cavity.

16. A method of operating the cooking appliance according to claim 1 to cook a food item within the cooking cavity via a steam-assisted cooking process, comprising:
   (a) receiving water within the reservoir;
   (b) initiating a pre-heating stage, the pre-heating stage comprising energizing the convection heating element and the fan; and
   (c) thereafter initiating a post-heating stage when a measured temperature in the cooking cavity reaches a predetermined temperature, the post-heating stage comprising energizing the convection heating element and the fan;
   wherein during steps (b) and (c) the fan directs heated air along the direct line-of-sight to impinge directly on a surface of the water in the reservoir thereby converting at least a portion thereof to steam, and circulates heated air and steam throughout the cooking cavity;

wherein the measured temperature is continuously measured throughout the steam-assisted cooking process; and wherein no heating element located below the reservoir is energized during the steam-assisted cooking process.

17. The method of claim 16, wherein no additional heating element(s) are energized during the steam-assisted cooking process.

18. A method of operating the cooking appliance according to claim 1, comprising directing a stream of heated air from the convection heating system along the direct line-of-sight to impinge on a surface of water located in the reservoir, thereby converting at least a portion of said water to steam, and circulating said steam within the cooking cavity.

19. The cooking appliance of claim 1, said shroud defining an outlet configured to direct said portion of the air heated by the convection heating element into the reservoir along the direct line-of-sight on exiting the shroud, said outlet being directly above a portion of said reservoir.

* * * * *